United States Patent [19]
Coleman et al.

[11] Patent Number: 5,692,708
[45] Date of Patent: Dec. 2, 1997

[54] METHOD AND APPARATUS FOR AUTOMATICALLY TRIMMING AN AIRPLANE STABILIZER

[75] Inventors: Edward E. Coleman, Seattle; Michael S. McCuen, Issaquah; Kioumars Najmabadi, Bellevue, all of Wash.

[73] Assignee: The Boeing Company, Seattle, Wash.

[21] Appl. No.: 441,682

[22] Filed: May 15, 1995

[51] Int. Cl.$^6$ .................................................. B64C 13/16
[52] U.S. Cl. ................................................ 244/178
[58] Field of Search .................. 244/180, 181, 244/182, 178, 76 B, 175, 177, 185, 186, 187, 188, 194, 195; 364/434, 433, 440, 442, 463

[56] References Cited

U.S. PATENT DOCUMENTS

| | | | |
|---|---|---|---|
| 3,945,593 | 3/1976 | Schanzer | 244/181 |
| 5,079,711 | 1/1992 | Lambregts et al. | 244/181 |
| 5,127,608 | 7/1992 | Farineau et al. | 244/178 |
| 5,527,002 | 6/1996 | Bilange et al. | 244/195 |

*Primary Examiner*—Galen L. Barefoot
*Attorney, Agent, or Firm*—Christensen, O'Connor, Johnson & Kindness PLLC

[57] ABSTRACT

A method and apparatus for managing the trim of an airplane stabilizer whose elevator is controlled by a highly augmented elevator control law is disclosed. The augmented portion of the elevator command $$(\delta_{e_{CMD_{aug}}})$$

is evaluated(13) to determine if it is above or below a variable threshold whose magnitude is dependent on airspeed. Portions above or below the threshold are integrated (15) to determine if the augmented portion of the elevator command is rapidly or slowly diverging. A stabilizer trim command is rapidly produced if the augmented portion of the elevator command is rapidly diverging and produced more slowly if the augmented portion is slowly diverging. The stabilizer trim command causes the production of a trim up or trim down command (25/27) depending upon whether the stabilizer needs to be moved up or down. Trim up commands (25) are inhibited under certain conditions, such as when the tail of the airplane is near the ground, when the airplane angle of attack is above the point where further nose up trim would be ineffective, or when the stabilizer trim limit has been exceeded. Trim down commands (27) are inhibited when the stabilizer trim down limit has been exceeded. Trim up and trim down commands are also inhibited when the command would drive the stabilizer out of fair with the elevator. Finally, provision is made for direct stabilizer trim control by the pilot of the airplane in the event that the elevator is limited and, thus, the stabilizer is required to produce additional pitch response.

21 Claims, 5 Drawing Sheets

METHOD AND APPARATUS FOR AUTOMATICALLY TRIMMING AN AIRPLANE STABILIZER

FIELD OF THE INVENTION

This invention is directed to a method and apparatus for trimming the stabilizer of an airplane and, more particularly, to methods and apparatus for automatically trimming the stabilizer of an airplane.

BACKGROUND OF THE INVENTION

In the past, stabilizer autotrim systems have typically been designed into or for use with autopilot systems. Autopilot stabilizer autotrim systems have been designed to accomplish three functions. First, autopilot stabilizer autotrim systems have been designed to manage stabilizer position so as to assure, over the long term, that sufficient elevator authority is available for a pitch maneuver to take place, if this becomes necessary. Second, autopilot stabilizer autotrim systems strive to keep the elevator faired with the stabilizer during cruise to minimize long-term trim drag. Third, autopilot stabilizer autotrim systems are designed to keep the number of actuator cycles below system fatigue and component wear limits. The first two objectives are usually achieved by driving the stabilizer such that elevator commands are reduced to zero. The third objective is achieved by designing the control logic of the stabilizer autotrim system such that the stabilizer is not driven back and forth unnecessarily.

Typically, stabilizer autotrim system functions incorporated into airplane autopilot systems, such as the autopilot systems utilized on the Boeing 757, 767, and 747-400 airplanes, are accomplished by a set of logic that determines when, and in which direction, an airplane stabilizer should be moved. The autopilot system produces a trim control signal designed to accomplish the intended result. The trim control signal is used to control the operation of the stabilizer movement mechanism. The stabilizer autotrim logic of the autopilot monitors the deviation of the elevator from the desired trim position and produces a stabilizer trim command if the deviation becomes sufficiently large for a predetermined period of time. Autopilot stabilizer autotrim systems have utilized fixed values to set both elevator thresholds and the duration of threshold exceedance required to initiate a trim command. Once activated, the trim mechanism is operated in the proper direction until the elevator is faired with the stabilizer.

As noted above, in the past, stabilizer autotrim systems have typically been designed for incorporation in autopilot systems. For the most part, autopilot system elevator commands are well behaved. Autopilot system elevator commands normally have a lower band width than do the elevator commands produced by a pilot during manual flight. Further, autopilot system elevator commands are generally more predictable than are the pilot elevator commands that occur during manual flight. The designers of autopilot stabilizer autotrim systems have been able to count on pilot intervention with respect to both elevator and direct stabilizer trim control should a situation present itself requiring an evasive maneuver.

In recent years, fly-by-wire control systems, such as the one incorporated in the Boeing 777, have been developed. The pitch control law incorporated in such systems requires full automatic stabilizer management without, under most conditions, requiring pilots to operate trim thumb switches. This and other requirements cannot be met by previously developed autopilot stabilizer autotrim systems. Increased elevator activity and the need for relatively quick stabilizer trim response during manual flight makes it difficult to establish a single threshold/persistence requirement that provides sufficient performance without resulting in excessive stabilizer actuation cycles. That is, the objective of minimizing stabilizer cycles compromises the objectives of keeping the airplane elevator faired and retaining maximum elevator authority. Further, the stabilizer autotrim target of zero elevator is not appropriate in systems that allow large pilot control column displacements. The incorporation of prior art autopilot stabilizer autotrim systems in fly-by-wire manual control systems can reduce the pitch authority available during a rapid column reversal. Also, in flight conditions where the elevator and stabilizer are not able to generate pitching moments, having stabilizer trim "chase" the elevator may not be appropriate.

In summary, there is a need for a stabilizer autotrim system that produces a fast response to large changes in pitch trim requirements and a slower response to small, short-lived exceedances of autotrim thresholds. Further, the system should provide adequate response when pitch trim is needed by an airplane flying through turbulence. In addition, stabilizer trim should be managed in harmony with manual elevator control. Also, stabilizer commands should be inhibited when stabilizer trim is not effective. Still further, direct pilot stabilizer trim control should be available for use when elevator authority limits are reached. The present invention is directed to providing a method and apparatus for automatically controlling an airplane stabilizer that achieves the foregoing and other objectives.

SUMMARY OF THE INVENTION

In accordance with this invention a method and apparatus for managing the trim of an airplane stabilizer whose elevator is controlled by a highly augmented elevator control law is disclosed. The augmented portion of the elevator command is evaluated to determine if it is above or below a variable trim threshold whose value is dependent on airspeed. Portions above and below the variable threshold are integrated to determine if the augmented portion of the elevator command is rapidly or slowly diverging. A stabilizer trim command is rapidly produced if the augmented portion of the elevator command is rapidly diverging and produced more slowly if the augmented portion is slowly diverging. The stabilizer trim command causes the production of a trim up or trim down command, depending upon whether the stabilizer needs to be moved up or down.

In accordance with the other aspects of this invention, the stabilizer is moved more rapidly if the augmented portion of the elevator command exceeds another threshold that lies above the variable trim threshold.

In accordance with further aspects of this invention, trim up commands are inhibited under certain conditions, such as when the tail of the airplane is near the ground, when the airplane angle of attack is above the point where further nose up trim would be ineffective, or when the stabilizer trim up limit has been exceeded.

In accordance with other aspects of this invention, trim down commands are inhibited when the stabilizer trim down limit has been exceeded.

In accordance with still further aspects of this invention, trim up and trim down commands are also inhibited if the command would drive the stabilizer out of fair with the elevator.

In accordance with yet still other aspects of this invention, the stabilizer is directly controllable by the pilot of the airplane.

So, as will be readily appreciated from the foregoing description, the invention provides a method and apparatus for automatically controlling the trim of an airplane stabilizer that accommodates quick and large elevator motions of the type that a pilot might command during manual flight. The method and apparatus also responds to the relatively slow and small motions that an autopilot might command. In addition, trim up and trim down commands are inhibited when airplane conditions are such that the stabilizer should not be trimmed.

BRIEF DESCRIPTION OF THE DRAWINGS

The foregoing features and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As is conventional, the invention is illustrated and described in the form of a control law containing discrete blocks designed to accomplish specific functions. However, it is to be understood that the invention can be actually implemented in various ways. For example, the various functions of the illustrated control law can be carried out by a suitably programmed digital computer system. Alternatively, the functions can be carried out by digital or analog circuits.

Figure 1:
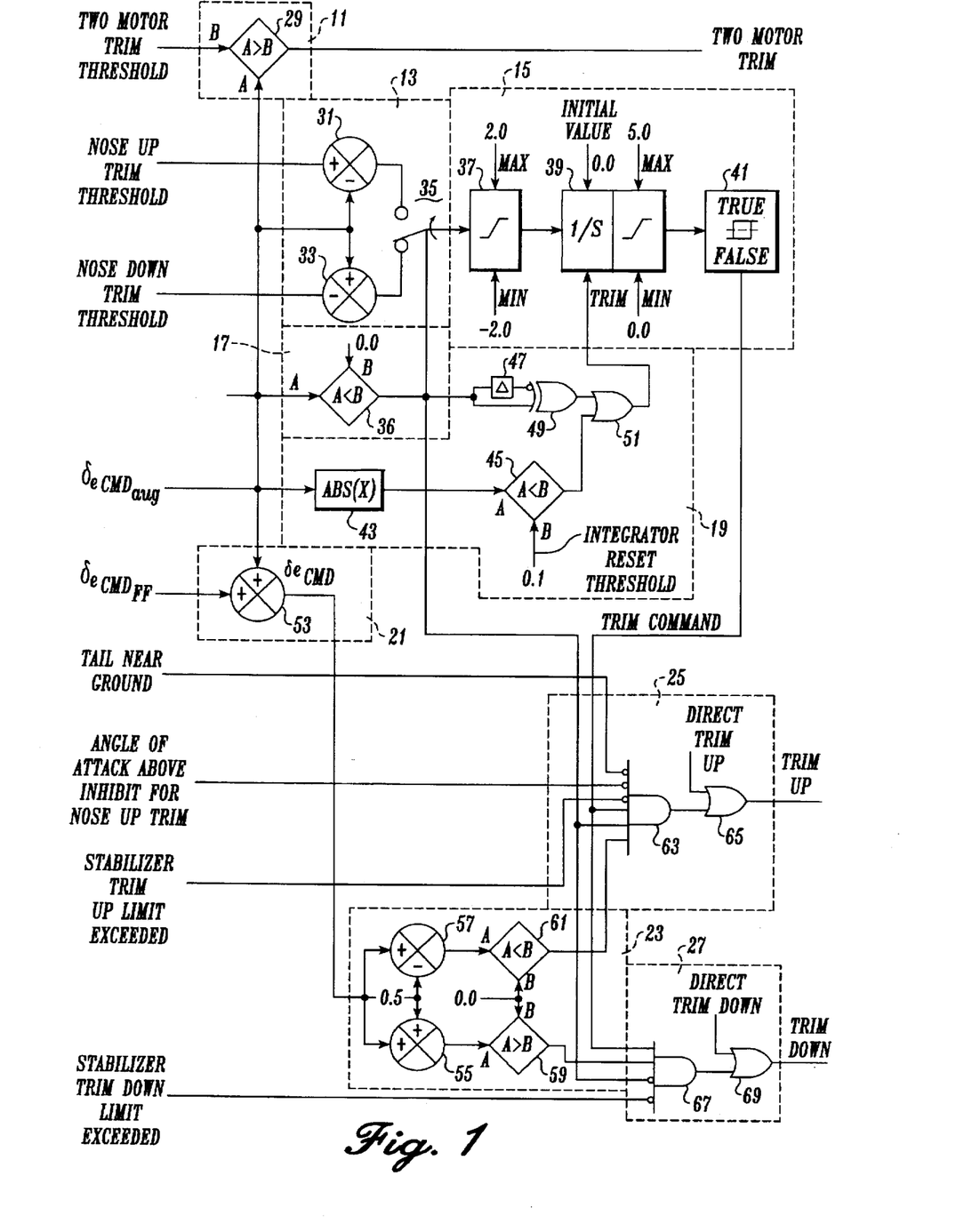
FIG. 1 is a control law diagram of an automatic stabilizer autotrim system formed in accordance with the invention.

FIG. 1 illustrates the presently preferred embodiment of the invention in the form of a control law that includes several blocks that contain elements designed to accomplish various functions. The blocks include: a two motor control block 11; a trim threshold block 13; an integrator block 15; a direction control block 17; an integrator initialization block 19; an elevator command signal block 21; a jackknife decision block 23; a trim up block 25; and a trim down block 27.

The two motor control block 11 includes a comparator 29 that compares a two motor trim threshold value, designated input B, with the value of the augmented portion $$(\delta_{e_{CMD_{aug}}})$$

of the elevator command, designated input A. See U.S. application Ser. No. 08/441,281 entitled "Aircraft Pitch-Axis Stability and Command Augmentation System" filed concurrently herewith, incorporated herein by reference, for a description of an elevator command having an augmented portion suitable for use by this invention. If the augmented portion of the elevator command is below the two motor trim threshold, the output of the comparator 29 is low or false. If the augmented portion of the elevator command is above the two motor trim threshold, the output of the comparator 29 is high or true. As described below, the two motor trim threshold is a variable threshold whose value depends on the airspeed of the airplane incorporating the invention.

When the output of the comparator 29 is low, a single motor is energized to move the stabilizer when a trim command occurs. If the output of the comparator 29 is high, two motors are energized to move the stabilizer when a trim command occurs. The second drive motor provides extra trimming speed when needed, i.e., when the augmented portion of the elevator command reaches a suitably high value. The two motor speeds are summed such that the surface rate of change of the stabilizer when the two motors are energized is twice that when a single motor is energized.

The remaining blocks of the upper portion of the embodiment of the invention illustrated in FIG. 1, in effect, determines whether trimming should or should not occur and the trimming period. The trim threshold block 13 includes two subtractors 31 and 33 and a switch 35. The first subtractor 31 subtracts the augmented portion of the elevator command from a nose up trim threshold, and the second subtractor 33 subtracts a nose down trim threshold from the augmented portion of the elevator command. The outputs of the subtractors 31 and 33 are applied to the switch 35 whose position is controlled by the output of the direction control block 17 in the manner hereinafter described. More specifically, the nose up trim threshold is applied to the positive input of the first subtractor 31 and the nose down trim threshold is applied to the negative input of the second subtractor 33. The augmented portion of the elevator command $$(\delta_{e_{CMD_{aug}}})$$

is applied to the negative input of the first subtractor 31 and to the positive input of the second subtractor 33.

While the nose up and nose down trim thresholds may be different, preferably they are the same magnitude with opposite sign. The nose up trim threshold is negative while the nose down trim threshold is positive. In any case, the nose up and nose down trim thresholds are variable in accordance with airspeed. The variation is designed to account for the improvement in airplane control surface response that occurs as airspeed increases. In one actual embodiment of the invention, the nose up and nose down trim thresholds are approximately 0.6 degrees at zero airspeed and 0.3 degrees at cruise airspeed with a linear variation as a function of airspeed in between zero and cruise airspeed, and above cruise airspeed. In this embodiment of the invention the two motor trim threshold is twice the nose up and nose down trim threshold at low (zero) airspeed and four times the nose up and nose down trim threshold at cruise airspeed and above, with a linear variation in between.

The direction control block 17 includes a comparator 36 that compares the augmented portion of the elevator command, designated as input A, with a predetermined threshold value, designated as input B. While, preferably, B is zero (0), B could have another value, if desired. If input A is less than input B, the output of the comparator 36 is high or true and if input A is equal to or greater than input B, the output of the comparator 36 is low or false. As noted above, the output of direction control block 17, which is the output of the comparator 36, controls the state of the switch 35. The output of the switch 35 is applied to the input of the integrator block 15. The switch is controlled such that if the augmented portion of the elevator command is less than zero (i.e., A is less than B), the switch 35 connects the output of the first subtractor 31 to the input of the integrator block 15. If the augmented portion of the elevator command is equal to or greater than zero (i.e., A is greater than or equal to B), the output of the second subtractor 33 is connected to the input of the integrator block 15.

The integrator block 15 includes a limiter 37, an integrator 39 having a limited output, and a hysteresis element 41. The output of the switch 35 is limited by the limiter 37 which may, for example, have maximum/minimum value equal to 2.0 degrees and −2.0 degrees, respectively. The output of the limiter 37 is integrated by the integrator 39.

The integrator 39 is shown as having an initial value of 0.0 and a trigger input. When the trigger input is in a high state, the integrator is initialized to 0.0. The trigger signal is produced by the integrator initialization block 19 in the manner described below. The output of the integrator is limited between a minimum value of 0.0 and a predetermined maximum value, such as 5.0. The limited output is applied to the hysteresis element 41, which shifts between low or false and high or true states. Thus, the output of the hysteresis element is a binary signal having either a low or false value (binary zero) or a high or true value (binary one). The midpoint of the hysteresis circuit is the midpoint of the output of the limited integrator 39, i.e., 2.5. The band width of the hysteresis circuit is ±2.45. As a result, the low transition point of the hysteresis element is 0.05 and the high transition point is 4.95. Obviously, the values illustrated in FIG. 1 and set forth above are exemplary. Other values could be chosen, if desired.

The integrator initialization block 19 includes an absolute value element 43, a comparator 45, a previous value storage element 47, a two input exclusive OR gate 49, and a two input OR gate 51. One of the inputs of the exclusive OR gate is an inverted input.

The augmented portion of the elevator command $$(\delta_{e_{CMD_{aug}}})$$

is applied to the input of the absolute value element 43. The output of the absolute value element, which is the absolute value of the augmented portion of the elevator command, is compared in the comparator 45 with a threshold value, such as 0.1 degrees, for example. If the absolute value of the augmented portion of the elevator command is less than the threshold value, the output of the comparator 45 is high or true. If the augmented portion of the elevator command is equal to or exceeds the threshold value, the output of the comparator 45 is low or false. The output of the comparator 45 is applied to one input of the OR gate 51 and the output of the OR gate 51 is applied to the trigger input of the integrator 39. As a result, the integrator 39 is initialized each time the absolute value of the augmented portion of the elevator command drops below the integrator reset threshold value, i.e., 0.1 degrees in the illustrated embodiment of the invention.

The output of the directional control block 17 is applied to the noninverted input of the exclusive OR gate 49. The output of the directional control block 17 is also applied to the input of the previous value storage element 47. The output of the previous value storage element 47 is applied to the inverted input of the exclusive OR gate 49. As a result, the output of the exclusive OR gate pulses high (true) for one pass each time the augmented portion of the elevator command switches direction.

The output of the exclusive OR gate 49 is applied to the second input of the OR gate 51. As a result, the integrator 39 is initialized to zero whenever the augmented portion of the elevator command changes direction, i.e., shifts from positive to negative, or vice versa and whenever the augmented portion of the elevator command lingers within ±0.1 degree.

The elevator command signal block 21 includes a two input summer 53. One input receives the augmented portion of the elevator command $$(\delta_{e_{CMD_{aug}}}),$$

and the other input receives the feed forward portion of the elevator command $$(\delta_{e_{CMD_{ff}}}).$$

See U.S. Pat. application Ser. No. 08/441,281, the subject matter of which has been incorporated herein by reference for a description of an elevator command having a feed forward portion suitable for use by this invention. The output of the summer 53 is the elevator command ($\delta_{e_{CMD}}$), which is applied to the jackknife decision block 23.

The jackknife decision block 23 includes a two input summer 55, a subtractor 57, and two comparators 59 and 61. The elevator command is applied to one of the inputs of the summer 55 and to the positive input of the subtractor 57. A fixed value, such as 0.5 degrees, is applied to the second input of the summer 55 and to the negative input of the subtractor 57. The output of the summer 55 is applied to one input, designated the A input, of the first comparator 59 and the output of the subtractor 57 is applied to one input, designated the A input, of the second comparator 61. The second inputs of the first and second comparators 59 and 61, designated the B input, receive a threshold value, preferably 0.0.

In essence, the jackknife decision block 57 first generates a slightly offset elevator command and then determines whether the offset command is complementary or opposed to a trim up or trim down command. This information is used by the trim up and the trim down blocks in the manner described below to inhibit the production of trim up and trim down commands, if such commands would oppose, rather than complement, the elevator command. More specifically, the summer adds a fixed value, 0.5 degrees in the illustrated embodiment of the invention, to the elevator command, and the first comparator 59 determines if the resulting value is greater than zero. If the value is greater than zero, the output of the first summer is high or true. If the value is equal to or less than zero, the output of the first summer is low or false. In contrast, the subtractor 57 subtracts the fixed value, i.e., 0.5 degrees, from the elevator commands, and the second comparator 61 determines if the resulting value is less than zero. If the value is less than zero, the output of the second comparator is high or true. If the value is equal to or greater than zero, the output of the second comparator is low or false. As will be better understood from the following description of the trim up and trim down blocks 25 and 27, the stabilizer will not be moved if the stabilizer will be commanded to move in a direction that would cause elevator/stabilizer jackknife, i.e., cause the stabilizer to move opposite to the elevator.

The trim up control block 25 includes a six input AND gate 63 and a two input OR gate 65. The six input AND gate 63 includes three inverted inputs and three noninverted inputs. The three inverted inputs are connected to a plurality of inhibit sources that inhibit the production of a trim up command if the relevant conditions are present. One of the inhibit conditions is whether the tail of the airplane is near to the ground, which is determined from radio altimetry and airplane pitch attitude data. If the tail of the airplane is near the ground, an associated inverted input of the six input AND gate 63 is high or true, preventing the AND gate output from shifting from a low or false state to a high or true state.

The second inhibit condition is whether the angle of attack of the airplane is above an inhibit point for nose up trim. If the angle of attack of the aircraft is above the inhibit point, an associated inverted input of the six input AND gate 63 is high or true, preventing the output of the AND gate from shifting from a low or false state to a high or true state. The third inhibit condition is whether the stabilizer trim up limit has been exceeded. If the trim up limit of the stabilizer has been reached, an associated inverted input of the six input AND gate 63 is high or true, preventing the output of the AND gate 63 from shifting from a low or false state to a high or true state.

One of the noninverted inputs of the six input AND gate 63 receives the output of the hysteresis element 41 of the integrator block 15. A second noninverted input of the six input AND gate 63 receives the output of the direction control block 17. The third noninverted input of the six input AND gate 63 receives the output of the second comparator 61 of the jackknife decision block 23.

As will be readily appreciated from the foregoing description, the output of the six input AND gate 63 will only shift from a low or false state to a high or true state when a trim command is produced by the hysteresis element 41 if and only if the tail of the airplane is not near the ground; the angle of attack of the airplane is not above the inhibit point for nose up trim; the stabilizer trim up limit has not been exceeded; the augmented portion of the elevator command is negative; and the elevator command is complementary to a stabilizer trim up command.

The output of the six input AND gate 63 is applied to one input of the two input OR gate 65. A direct trim up input received from the pilot's trim controller is applied to the second input of the two input OR gate 65. The output of the two input OR gate 65 is the trim up stabilizer command. Thus, a trim up command is either automatically produced by the embodiment of the invention shown in FIG. 1 if the noted conditions are met, or manually produced by pilot intervention in the event that the elevator is limited in the nose up direction.

The trim down block 27 includes a four input AND gate 67 and a two input OR gate 69. The four input AND gate 67 includes two inverted inputs and two noninverted inputs. One of the inverted inputs of the four input AND gate 67 receives an inhibit signal if the stabilizer trim down limit is exceeded. More specifically, if the stabilizer trim down limit is exceeded, the related input of the four input AND gate 67 is high or true, which prevents the output of the four input AND gate from shifting from a low or false state to a high or true state. The output of the directional control block 17 is applied to the other inverted input of the four input AND gate 67. As a result, the four input AND gate 67 is inhibited if the output of the directional control block 17 is high, which occurs if the augmented portion of the elevator command is positive or equal to zero.

The output of the first comparator 59 of the jackknife decision block 23 is applied to one of the noninverted inputs of the four input AND gate 67. The output of the hysteresis element 41 is applied to the other noninverted input of the four input AND gate 67.

As will be readily appreciated from the foregoing description, the output of the four input AND gate 67 will only shift from a low or false state to a high or true state when a trim command is produced by the hysteresis element 41 if and only if the stabilizer trim down limit has not been exceeded; the augmented portion of the elevator command is positive or zero; and the elevator command is complementary to a stabilizer trim down command.

The output of the four input AND gate is applied to one input of the two input OR gate. A direct trim down input received from the pilot's trim controller is applied to the second input of the two input OR gate 69. The output of the two input OR gate is the trim down stabilizer command. Thus, a trim down command is either automatically produced by the embodiment of the invention shown in FIG. 1 if the noted conditions are met, or manually produced by pilot intervention in the event that the elevator is limited in the nose down direction.

As will be readily appreciated from the foregoing description of the automatic stabilizer control system illustrated in FIG. 1, the augmentation portion of the elevator command is compared with an autotrim threshold value to determine if and in which direction trim may be needed. The integrator block 15 determines when to start (and stop) commanding stabilizer trim. The logic is based on a variable threshold/persistence. The elevator command threshold for initialization of stabilizer autotrim varies as a function of impact pressure. The mount that the elevator command exceeds the variable threshold is limited and integrated. Autotrim is not commanded until the integrator ramps up to a predetermined value. As shown in FIGS. 3A and 3B and 4A and 4B, described below, this can occur rapidly or slowly.

Figure 2A:
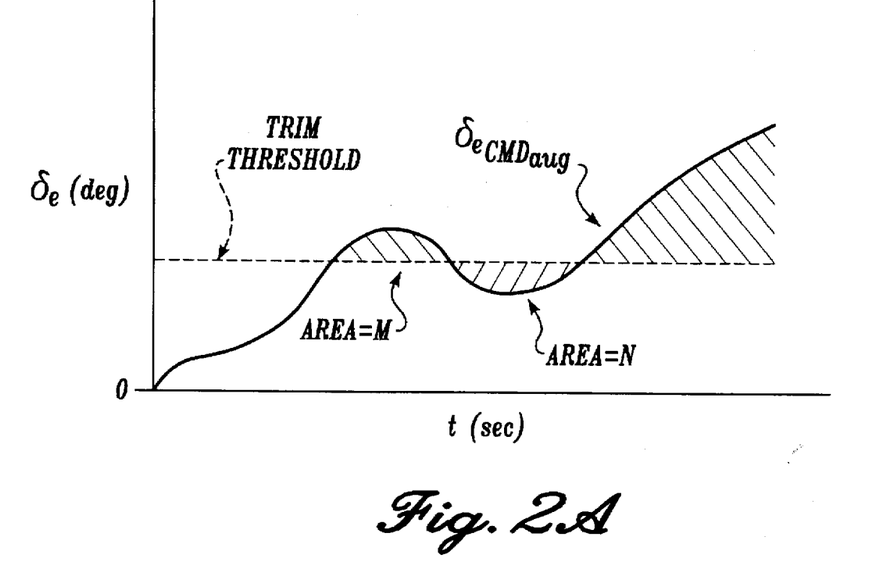
FIGS. 2A and 2B are waveform diagrams illustrating the response of the embodiment of the invention illustrated in FIG. 1 to an example of an elevator command whose augmented portion is diverging.
Figure 2B:
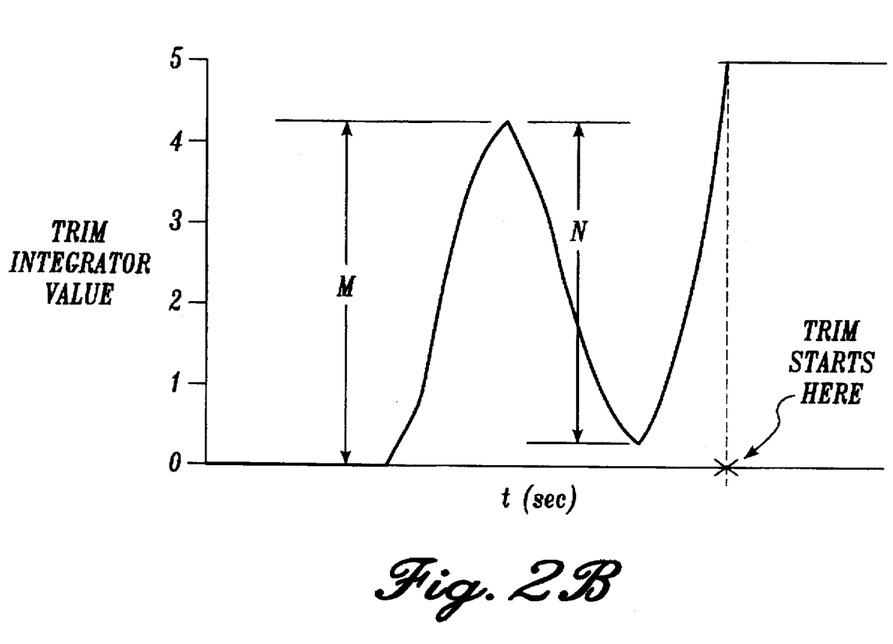

Another way to summarize the operation of the stabilizer autotrim system illustrated in FIG. 1 is that the system determines the area between the elevator command and the variable threshold. When the area exceeds a certain value, stabilizer autotrim is commanded. The stabilizer autotrim command stops when the augmented portion of the elevator command drops below a shut off threshold, namely the integrator reset threshold. FIGS. 2A and 2B depict a generalized response of the system. More specifically, FIG. 2A illustrates the augmented portion of an elevator command first ramping up until it exceeds the trim threshold. Thereafter, the augmented portion of the elevator command drops below the trim threshold and, then, it again exceeds the trim threshold. The amount of the augmented portion of the elevator command above the trim threshold the first time, denoted as area M, is insufficient to cause the integrator to ramp up to a level sufficient to cause the output of the hysteresis element 41 to shift from a low state to a high state. As a result, an autotrim command is not produced. The amount of the augmented portion of the elevator command below the trim threshold, denoted as area N, results in a decrease in the output of the limited integrator 39. After the augmented portion of the elevator command exceeds the trim threshold a second time by a magnitude adequate for the output of the integrator to ramp up to a value sufficient to cause the output of the hysteresis element 41 to switch from a low state to a high state, a trim command is produced. The trim command results in the creation of a trim up or trim down command (as appropriate), provided the command is not inhibited as a result of one of the heretofore-described inhibit conditions being present.

As will be readily appreciated from the foregoing description, the stabilizer autotrim system illustrated in FIG.

1 provides rapid response for conditions when the augmented portion of the elevator command is large. Because the output of the integrator is limited, a stabilizer trim command cannot occur for a minimum period after a prior command.

Figure 3A:
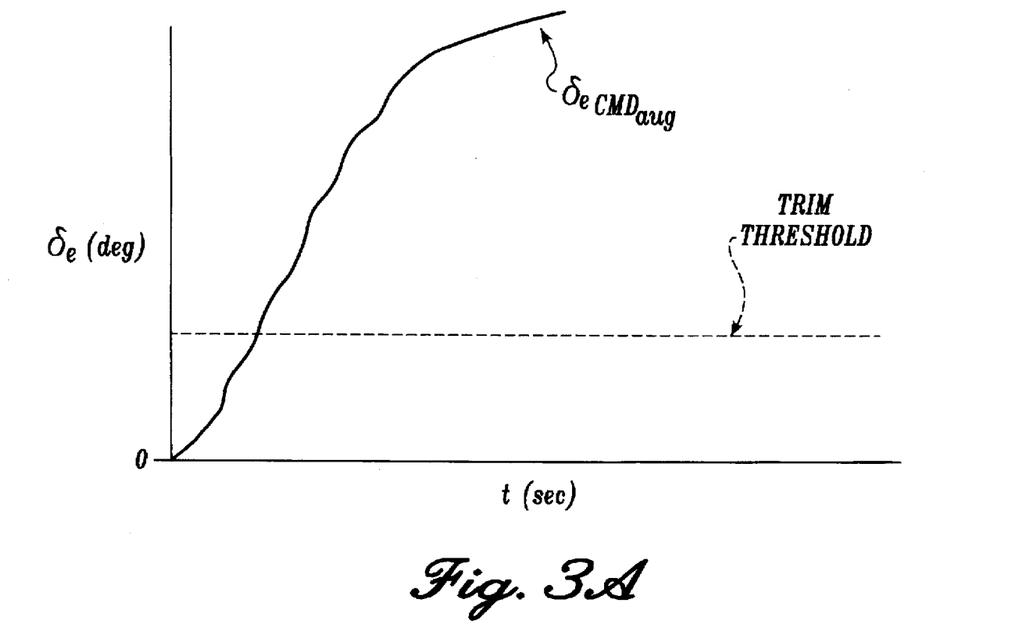
FIGS. 3A and 3B are waveform diagrams illustrating the response of the embodiment of the invention illustrated in FIG. 1 to an elevator command whose augmented portion is rapidly diverging.
Figure 3B:
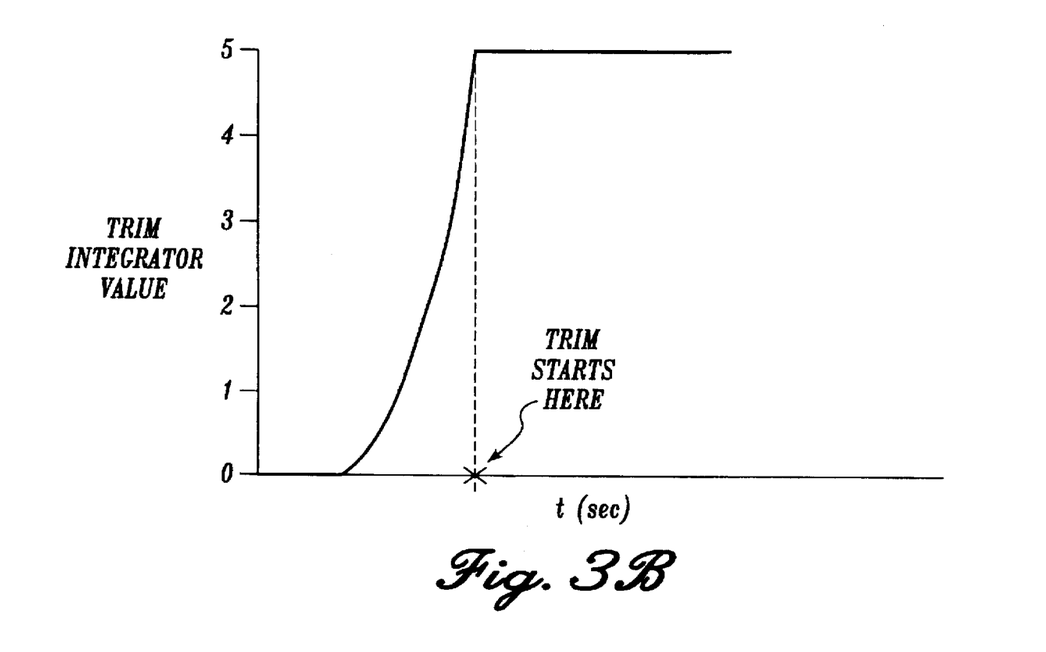
Figure 4A:
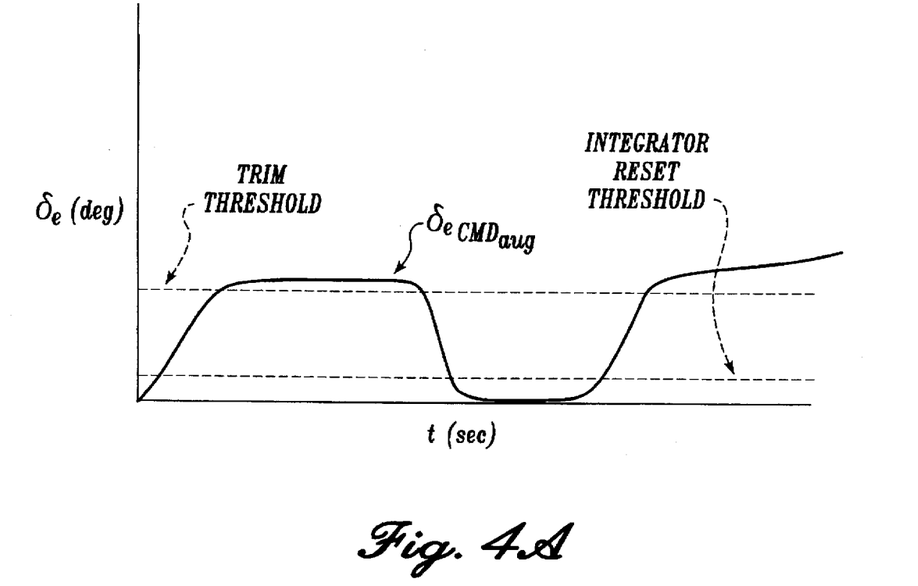
FIGS. 4A and 4B are waveform diagrams illustrating the response of the embodiment of the invention illustrated in FIG. 1 to an elevator command whose augmented portion is slowly diverging.
Figure 4B:
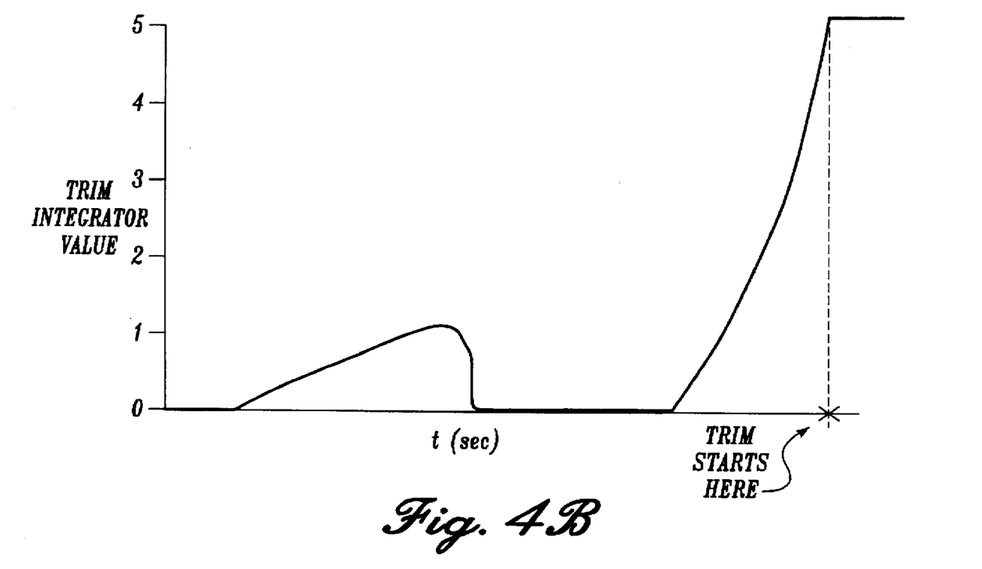

FIGS. 3A and 3B illustrate the response of the stabilizer autotrim system illustrated in FIG. 1 to a rapidly diverging augmented portion of an elevator command. FIGS. 4A and 4B show the response of the stabilizer autotrim system illustrated in FIG. 1 to a slowly diverging augmented portion of an elevator command. A trim command is quickly produced in the event of rapid divergence and produced more slowly in the event of slow divergence. The quickest response occurs if the augmented portion of the elevator command equals or exceeds the limit set by the limiter 37. Using the numerical values shown in FIG. 1 and described above, a trim command would occur in approximately 2.5 seconds under maximum conditions (5+2=2.5).

Figure 5A:
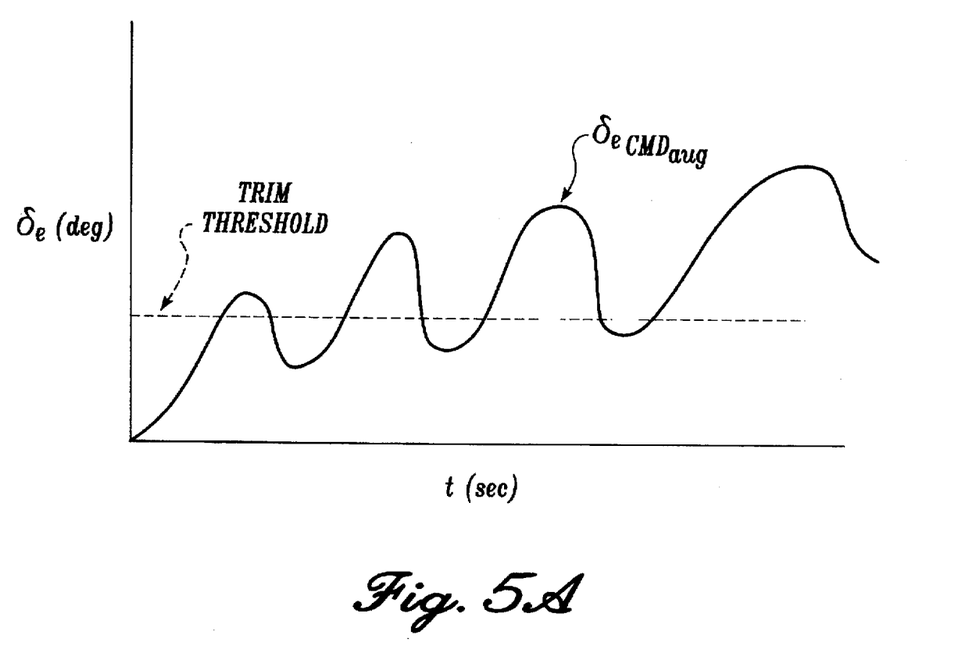
FIGS. 5A and 5B are waveform diagrams illustrating the response of the embodiment of the invention illustrated in FIG. 1 to an elevator command whose augmented portion is noisy.
Figure 5B:
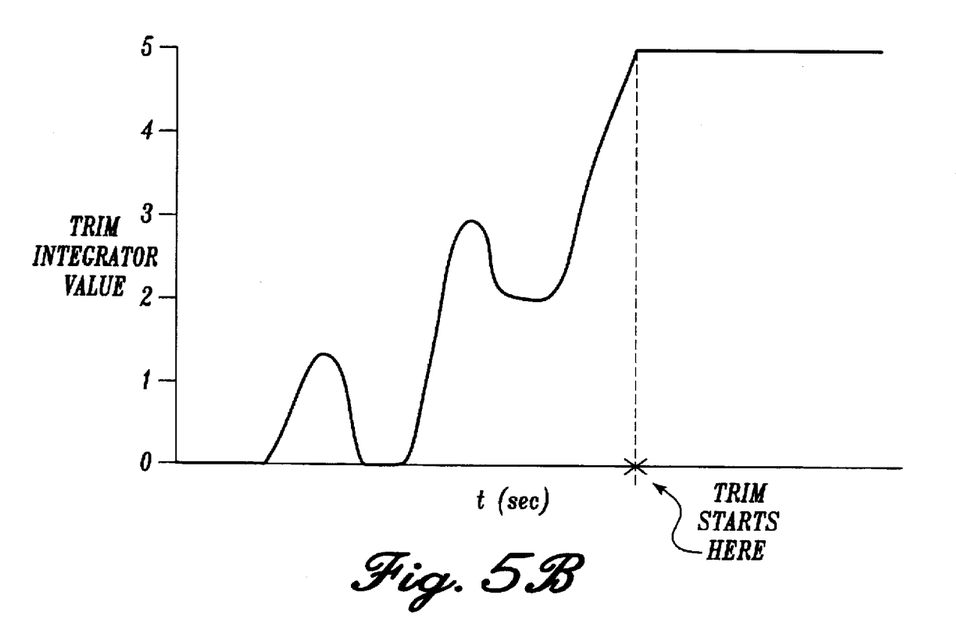

FIGS. 5A and 5B illustrate the response of the stabilizer autotrim system to the augmented portion of an elevator command that includes turbulence-induced noise. As shown there, fluctuations, e.g., noise, in the augmented portion of the elevator command are, in essence, filtered out by the embodiment of the invention shown in FIG. 1.

As will be readily appreciated from the foregoing description, the stabilizer autotrim system illustrated in FIG. 1 functions in harmony with a pilot's manual control of the elevators in much the same way that a good pilot would operate the stabilizer. On an airplane with manual stabilizer control, a pilot trims long-term column forces to zero. If, however, the pilot is performing a short-term maneuvering task, he or she may not trim out column forces because the airplane will likely return to the prior trim condition in the very near future. In general, the amount of column force that a pilot is willing to accept is an indication of the amount that the pilot expects to manipulate the column in the short term.

The philosophy behind the stabilizer autotrim system illustrated in FIG. 1 is that the elevator should be at its desired trim position when and if the column is returned to its centered or detent position. This provides roughly symmetric elevator authority about the column detent position and avoids the deficiencies found with the adaptation of existing autopilot stabilizer autotrim systems to a manual flight control system. This result is accomplished by using only the augmented portion of the elevator command to control stabilizer autotrim. With respect to stabilizer autotrim, the proportional column to elevator portion of the elevator command is ignored. A complementary feature of the stabilizer autotrim system is that the stabilizer is only allowed to be driven in a direction that will bring the elevator back to the desired trim position. Autotrim is inhibited if it will cause the stabilizer to move in a direction that would cause elevator/stabilizer jackknife.

Autotrim is inhibited if the airplane is in a nose up condition above a predetermined high angle of attack which is determined by when the elevator or stabilizer would be ineffective. Another inhibit condition is when the tail of the airplane is near the ground, as determined by filtered radio altitude and pitch attitude data.

The invention provides for pilot override in the form of control signals produced by the trim control elements (usually thumb switches) located in the cockpit of the airplane. If the elevator is limited and the thumb switch is activated in the direction of the limited elevator, the stabilizer is commanded in that direction, preferably via both motors. While the stabilizer autotrim system illustrated in FIG. 1 would normally be commanding stabilizer motion in the same direction as the pilot, the possibility exists that the elevator could be limited whereby the production of an autotrim command would be inhibited.

While the presently preferred embodiment of the invention has been illustrated and described, as will be readily appreciated by those skilled in the art and others, within the scope of the appended claims, various changes can be made therein without departing from the spirit of the invention.

The embodiments of the invention in which an exclusive property or privilege is claimed are defined as follows:

1. A method of automatically trimming an airplane stabilizer comprising:

comparing the augmented portion of an airplane elevator command with a variable trim threshold whose value is dependent on airspeed;

integrating the results of the comparison to produce a trim command, said trim command being rapidly produced if the augmented portion of the airplane elevator command is rapidly diverging and slowly produced if the augmented portion of the airplane elevator command is slowly diverging; and using the trim command to produce a trim up command or a trim down command depending upon the polarity of the augmented portion of the airplane elevator command.

2. The method claimed in claim 1 including moving the stabilizer more rapidly if the augmented portion of the elevator command exceeds another threshold that lies above said variable trim threshold.

3. The method claimed in claim 1 wherein said trim up command and said trim down command are inhibited when predetermined conditions are present.

4. The method claimed in claim 3 wherein said trim up command is inhibited if the tail of the airplane is near the ground.

5. The method claimed in claim 3 wherein said trim up command is inhibited if the airplane angle of attack is above a point where further nose up trim would be ineffective.

6. The method claimed in claim 3 wherein said trim up command is inhibited if the stabilizer trim up limit has been exceeded.

7. The method claimed in claim 3 wherein said trim down command is inhibited if the stabilizer trim down limit has been exceeded.

8. The method claimed in claim 3 wherein said trim up command and trim down command are inhibited if the command would drive the stabilizer out of fair with the elevator of the airplane.

9. The method claimed in claim 1 wherein the step of comparing the augmented portion of an airplane elevator command with a variable trim threshold whose value is dependent on airspeed comprises comparing the augmented portion of the airplane elevator command with a nose up trim threshold whose value is dependent upon airspeed and comparing the augmented portion of the airplane elevator command with a nose down trim threshold whose value is also dependent upon airspeed.

10. The method claimed in claim 9 including moving the stabilizer more rapidly if the augmented portion of the elevator command exceeds another threshold that lies above said variable trim threshold.

11. The method claimed in claim 9 wherein said trim up command and said trim down command are inhibited when predetermined conditions are present.

12. Apparatus for automatically trimming an airplane stabilizer comprising:

a comparator for comparing the augmented portion of an airplane elevator command with a variable trim threshold whose value is dependent upon airspeed;

an integrator system for integrating the results of the comparison and producing a trim command, said trim command being rapidly produced if the augmented portion of the airplane elevator command is rapidly diverging and slowly produced if the augmented portion of the airplane elevator command is slowly diverging; and a trim evaluator for receiving the results of said integration and the polarity of the augmented portion of the airplane elevator command and producing a trim up or trim down command depending upon the polarity of the augmented portion of the elevator command that lasts the duration of said trim command.

13. The apparatus claimed in claim 12 wherein said comparator includes:

a first combiner for subtractively combining the augmented portion of the airplane elevator command with a nose up trim threshold whose value is dependent upon airspeed;

a second combiner for subtractively combining the augmented portion of the airplane elevator command with a nose down trim threshold whose value is dependent upon airspeed; and a selector for selecting one of said combinations based on the polarity of the augmented portion of the airplane elevator command and supplying said selection to said integrator system.

14. The apparatus claimed in claim 13 wherein said integrator system includes a limiter for limiting said selection and an integrator for receiving and integrating said limited selection.

15. The apparatus claimed in claim 14 wherein said integrator system includes a limiter that limits the output of said integrator.

16. The apparatus claimed in claim 15 wherein said integrator system includes a hysteresis element for receiving the results of said limited integration and producing a binary output whose true and false states is based on the results of said limited integration.

17. The apparatus claimed in claim 16 wherein said trim evaluator includes a first inhibitor for inhibiting the production of said trim up command if the tail of said airplane is near the ground.

18. The apparatus claimed in claim 17 wherein said first inhibitor also inhibits the production of a trim up command if the angle of attack of said airplane is above the point where further nose up trim would be ineffective.

19. The apparatus claimed in claim 18 wherein said first inhibitor also inhibits the production of a trim up command if the stabilizer trim up limit of said airplane has been exceeded.

20. The apparatus claimed in claim 19 wherein said trim evaluator includes a second inhibitor that inhibits the production of a trim down command if the stabilizer trim down limit of said airplane has been exceeded.

21. The apparatus claimed in claim 20 wherein said first and second inhibitors inhibit the production of trim up and trim down commands if the commands would drive the stabilizer of the airplane out of fair with the elevator of the airplane.

* * * * *